(12) United States Patent
Khandual et al.

(10) Patent No.: US 11,307,796 B2
(45) Date of Patent: Apr. 19, 2022

(54) MAPPING MEMORY ALLOCATION REQUESTS USING VARIOUS MEMORY ATTRIBUTES

(71) Applicant: International Business Machines Corporation, Armonk, NY (US)

(72) Inventors: Anshuman Khandual, Bangalore (IN); Saravanan Sethuraman, Bangalore (IN); Venkata K. Tavva, Hyderabad (IN); Anand Haridass, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/144,406

(22) Filed: Sep. 27, 2018

(65) Prior Publication Data
US 2020/0104264 A1    Apr. 2, 2020

(51) Int. Cl.
*G06F 3/06* (2006.01)
*G06F 12/1009* (2016.01)
(Continued)

(52) U.S. Cl.
CPC .......... *G06F 3/0656* (2013.01); *G06F 3/061* (2013.01); *G06F 3/0611* (2013.01);
(Continued)

(58) Field of Classification Search
CPC .. G06F 3/0685; G06F 3/0635; G06F 12/1009; G06F 16/9024; G06F 11/073;
(Continued)

(56) References Cited

U.S. PATENT DOCUMENTS 5,127,098 A * 6/1992 Rosenthal ............. G06F 9/4881
                                                          711/202
5,951,658 A * 9/1999 Daray, Jr. ............. G06F 9/5016
                                                          710/52

(Continued)

FOREIGN PATENT DOCUMENTS

CN          104750557 A         7/2015

OTHER PUBLICATIONS

The Beginner's Guide to the Cloud by Fee (Year: 2013).*
(Continued)

*Primary Examiner* — Paul M Knight
(74) *Attorney, Agent, or Firm* — Law Office of Jim Boice

(57) ABSTRACT

A method stores data that handles page faults in an appropriate memory device based on a standing memory policy. One or more processors receive user requested memory buffer attributes that describe memory buffer attributes needed for various processes. The processor(s) store the user requested memory buffer attributes in an operating system virtual memory representation that describes various types of memories used by the system, create a standing memory policy based on the user requested memory buffer attributes, and store data on an appropriate memory device based on the standing memory policy. The processor(s) receive a page fault, which is based on the data being called by a process but not being currently mapped by a memory management unit (MMU) into a virtual address space of the process. The processor(s) then retrieve and return the data stored on the appropriate memory device in order to address the page fault.

20 Claims, 12 Drawing Sheets

(51) Int. Cl.
  *G06F 11/07* (2006.01)
  *G06F 12/109* (2016.01)
  *G06F 16/901* (2019.01)
(52) U.S. Cl.
  CPC .......... *G06F 3/0613* (2013.01); *G06F 3/0683* (2013.01); *G06F 3/0685* (2013.01); *G06F 11/073* (2013.01); *G06F 11/0793* (2013.01); *G06F 12/1009* (2013.01); *G06F 12/109* (2013.01); *G06F 16/9024* (2019.01); *G06F 2212/1032* (2013.01); *G06F 2212/657* (2013.01)
(58) Field of Classification Search
  CPC ............... G06F 11/0793; G06F 12/109; G06F 2212/1032; G06F 2212/657; G06F 3/0644; G06F 3/0656
  See application file for complete search history.

(56) References Cited

U.S. PATENT DOCUMENTS

| | | | |
|---|---|---|---|
| 2005/0094665 A1* | 5/2005 | Nalawadi ................. | H04L 12/12 370/468 |
| 2005/0204091 A1* | 9/2005 | Kilbuck .................... | G11C 7/10 711/103 |
| 2006/0195706 A1* | 8/2006 | Burchard .................. | G06F 5/10 713/300 |
| 2006/0256636 A1* | 11/2006 | Bahl ......................... | G06F 5/10 365/221 |
| 2006/0265552 A1 | 11/2006 | Davis et al. | |
| 2011/0258405 A1* | 10/2011 | Asaki ....................... | G06F 3/061 711/162 |
| 2012/0300017 A1* | 11/2012 | Li ............................. | H04N 19/196 348/14.09 |
| 2013/0019081 A1 | 1/2013 | Moyer | |
| 2013/0061007 A1* | 3/2013 | Bates ...................... | G06F 12/06 711/154 |
| 2014/0019674 A1* | 1/2014 | Park ....................... | G06F 12/0246 711/103 |
| 2014/0156959 A1* | 6/2014 | Heidelberger .......... | G06F 5/065 711/163 |
| 2014/0223098 A1* | 8/2014 | Lee ........................ | G06F 9/5016 711/118 |
| 2014/0240335 A1* | 8/2014 | Hu ......................... | G06F 12/0802 345/543 |
| 2015/0195214 A1* | 7/2015 | Sugiyama ............... | G06F 16/13 709/226 |
| 2015/0293845 A1 | 10/2015 | Hsu et al. | |
| 2015/0332750 A1* | 11/2015 | Dong ...................... | H01L 43/02 365/158 |
| 2016/0124674 A1* | 5/2016 | Seo ........................ | G06F 12/02 711/202 |
| 2016/0139807 A1* | 5/2016 | Lesartre .................. | G11C 5/04 711/154 |
| 2016/0360000 A1* | 12/2016 | Panigrahi ............. | G06F 12/0871 |
| 2018/0011640 A1* | 1/2018 | Takegawa ............. | G06F 3/0611 |
| 2018/0188989 A1* | 7/2018 | Nachimuthu ........ | G06F 12/0638 |
| 2020/0044963 A1* | 2/2020 | Kwok ................. | H04L 43/0882 |

OTHER PUBLICATIONS

Memory Management Unit (MMU) by Techopedia (Year: 2016).*
Kernel Definition by Linfo (Year: 2006).*
DRAM to live on as DDR5 memory by Shah (Year: 2016).*
P. Mell et al., "The NIST Definition of Cloud Computing", National Institute of Standards and Technology, Information Technology Laboratory, Sep. 2011, pp. 1-7.
A. Khandual, "Hierarchical Numa", IBM Corporation, 2017, pp. 1-59.

* cited by examiner

US 11,307,796 B2

MAPPING MEMORY ALLOCATION REQUESTS USING VARIOUS MEMORY ATTRIBUTES

BACKGROUND

The present invention relates to computer memory systems, and specifically to memory systems that utilize disparate types of memories as part of a comprehensive memory system. Still more particularly, the present invention is related to selecting an appropriate type of memory for a particular process.

SUMMARY

In one or more embodiments of the present invention, a method stores data that handles page faults in an appropriate memory device based on a standing memory policy. One or more processors receive user requested memory buffer attributes that describe memory buffer attributes needed for various processes. The processor(s) store the user requested memory buffer attributes in an operating system virtual memory representation that describes various types of memories used by the system, create a standing memory policy based on the user requested memory buffer attributes, and store data on an appropriate memory device based on the standing memory policy. The processor(s) receive a page fault, which is based on the data being called by a process but not being currently mapped by a memory management unit (MMU) into a virtual address space of the process. In response to receiving the page fault, the processor(s) retrieve and return the data stored on the appropriate memory device in order to address the page fault.

In other embodiments, the present invention as described in the method is implemented in a computer system and/or as a computer program product.

DETAILED DESCRIPTION

Figure 1:
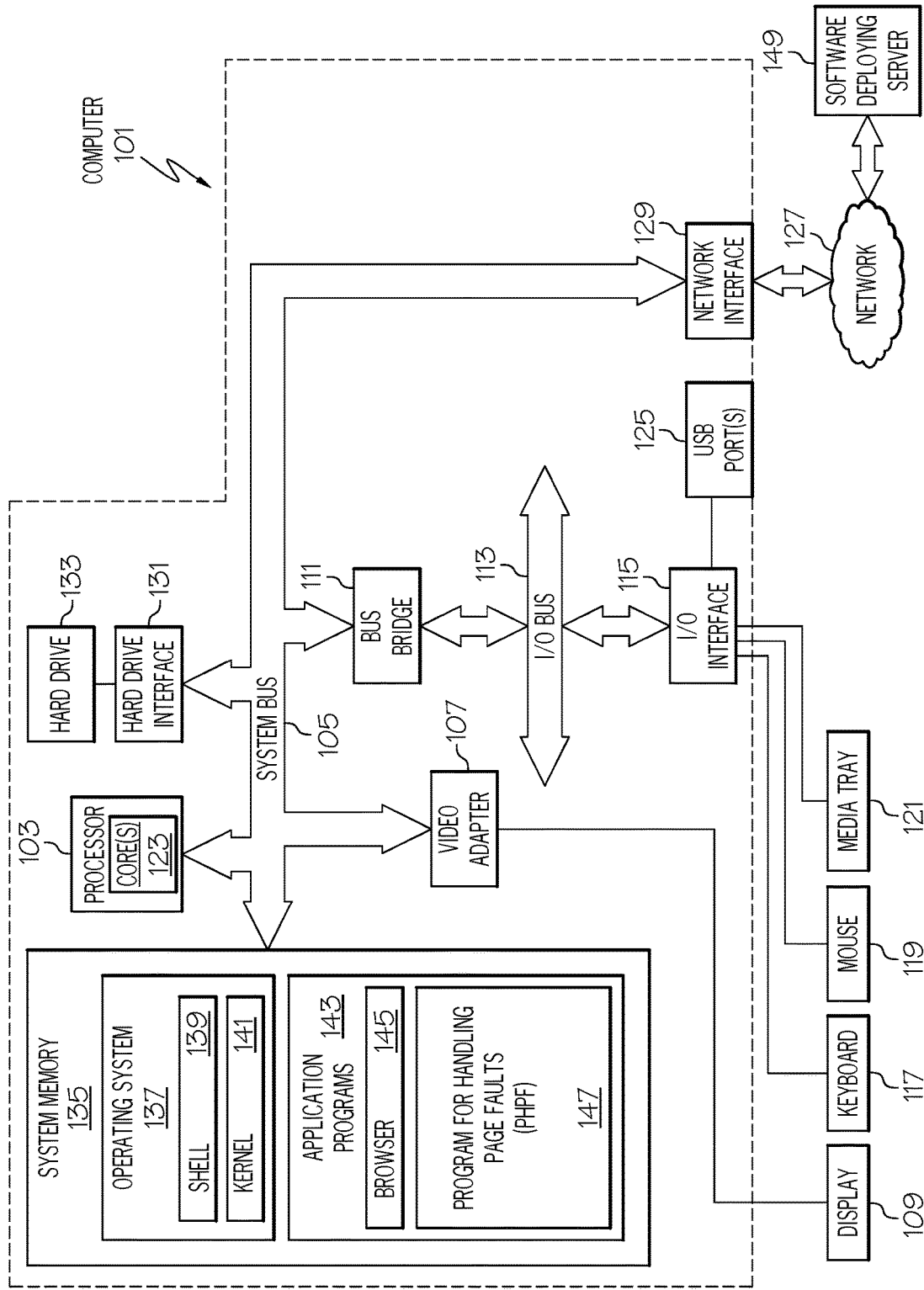
FIG. 1 depicts an exemplary system and network that is used in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connects to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 shown in FIG. 1.

In one or more embodiments of the present invention, exemplary computer 101 includes a processor 103 that is coupled to a system bus 105. Processor 103 utilizes one or more processors, each of which has one or more processor cores 123. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including but not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Handling Page Faults (PHPF) 147. PHPF includes code for implementing the processes described below, including those described in FIGS. 2-10. In one embodiment, computer 101 is able to download PHPF 147 from software deploying server 149, including in an on-demand basis, wherein the code in PHPF 147 is not downloaded until needed for execution. In one embodiment of the present invention, software deploying server 149 performs all of the functions associated with the present invention (including execution of PHPF 147), thus freeing computer 101 from having to use its own internal computing resources to execute PHPF 147.

The hardware elements depicted in computer 101 are not intended to be exhaustive, but rather are representative to highlight essential components required by the present invention. For instance, in one or more embodiments computer 101 includes alternative memory storage devices such as magnetic cassettes, digital versatile disks (DVDs), Bernoulli cartridges, and the like. These and other variations are intended to be within the spirit and scope of the present invention.

A memory sub-system with heterogeneous standards and technologies can be part of the same memory system. That is, in various embodiments of the present invention a memory system includes memory modules that are volatile, such as Dynamic Random Access Memory (DRAM), Spin-Transfer Torque-Magnetic Random Access Memory (SST-MRAM), Phase Change Memory (PCM), etc., each of which has its own standards, protocols, and physical design, even if they are pluggable into a same type of socket (e.g., a Dual In-line Memory Module (DIMM) socket) for connection to a main memory bus (or front end bus) in a computer. Even different versions of DRAM, such as Double Data Rate (DDR) memory chips that use standards such as DDR5, DDR4, LPDDR, etc. can be part of a single memory system.

In an enterprise server setup, applications with various needs and system demands co-exist.

In light of heterogeneous memories and applications having various needs and system demands, one or more embodiments of the present invention present a system for allocating, mapping, and/or migrating (on-demand) applications to a memory system that aptly suits the applications needs.

For example, power hungry workloads can use LPDDR (low power DDR) to save power; high performance workloads can be placed in DDR5 or even LLDRAM (low latency DRAM); and persistent applications can be placed in MRAM/PCM or NVDIMMs (non-volatile DIMMs) based on latency requirements.

Thus, one or more embodiments of the present invention addresses the need to appropriately allocate certain types of memory to certain types of application needs.

Memory allocation requests and memory devices have the following properties associated with them to represent various characteristics: 1) latency (speed of random access); 2) bandwidth (speed of contiguous data stream processing); 3) reliability (probable rate of memory failure); 4) power consumption (power consumption in holding the data in memory); 5) device compute (logic for performing rudimentary logic processing on the device without use of a central processing unit); 6) density (density of transistors/switches on a memory chip); and 7) persistence (i.e., whether the memory module is volatile, such as a DRAM module, or non-volatile, such as a STTRAM module, a PCM module, etc.).

In accordance with one or more embodiments of the present invention, memory allocation requests come from user space through new attribute-based memory system calls, which update a memory policy associated with either the Virtual Memory Address (VMA) of a particular memory module or the task structure of the application that is calling the memory. User space is defined as an environment in which an application runs. Thus, if a call is made from "user space", the call is being made from an application that is running on a computer system.

If called memory is not currently mapped by a Memory Management Unit (MMU) into the virtual address space of the memory/process, then a page fault occurs, requiring the memory data to be retrieved, mapped, and allocated to an actual physical page. In accordance with one or more embodiments of the present invention and in response to a page fault, an applicable memory policy is determined before proceeding with actual physical page allocation.

Certain devices (e.g., network cards, Field Programmable Gate Array (FPGA) cards, etc.) have on-board memory. This on-board memory shares a block of address space with system memory in a computer (e.g., DRAM), such that memory addresses of both the memory that is on-board the devices and the system memory are readily accessible. Like memory in system memory, which remains coherent (has the same data values) as cache memory, disk memory, etc., the MMU will ensure that an update to the memory on the devices is reflected in shared memory address space. This leads to devices that have Coherent Device Memory (CDM), which has coherent memory across the system.

In one or more embodiments of the present invention, devices that have CDM, along with the system memory (e.g., DRAM), expose system call interfaces to fetch memory attribute requests (e.g., a request for a memory having certain characteristics such as those described above) from the user space (e.g., a request from an application for memory to be allocated for that application). Such a request can come from an application, an operating system, and/or a kernel (i.e., a portion of an operating system that mediates access to a computer's resources, memory, and input/output devices; manages memory; etc.).

After gathering all these requests, the kernel finds a suitable memory device that matches the allocation request as closely as possible. The task of matching an allocation request to a particular memory thus enables a smooth operation of a computer system that has a multi-attribute memory.

In one or more embodiments of the present invention, on systems with attribute based memory devices, each structural zone has a DRAM based free_area[ ] as well multiple CDM based free_area[ ] organized in a Red Black (RB) tree format, which is a self-balancing binary search tree in which the height of the tree is minimized.

Figure 2:
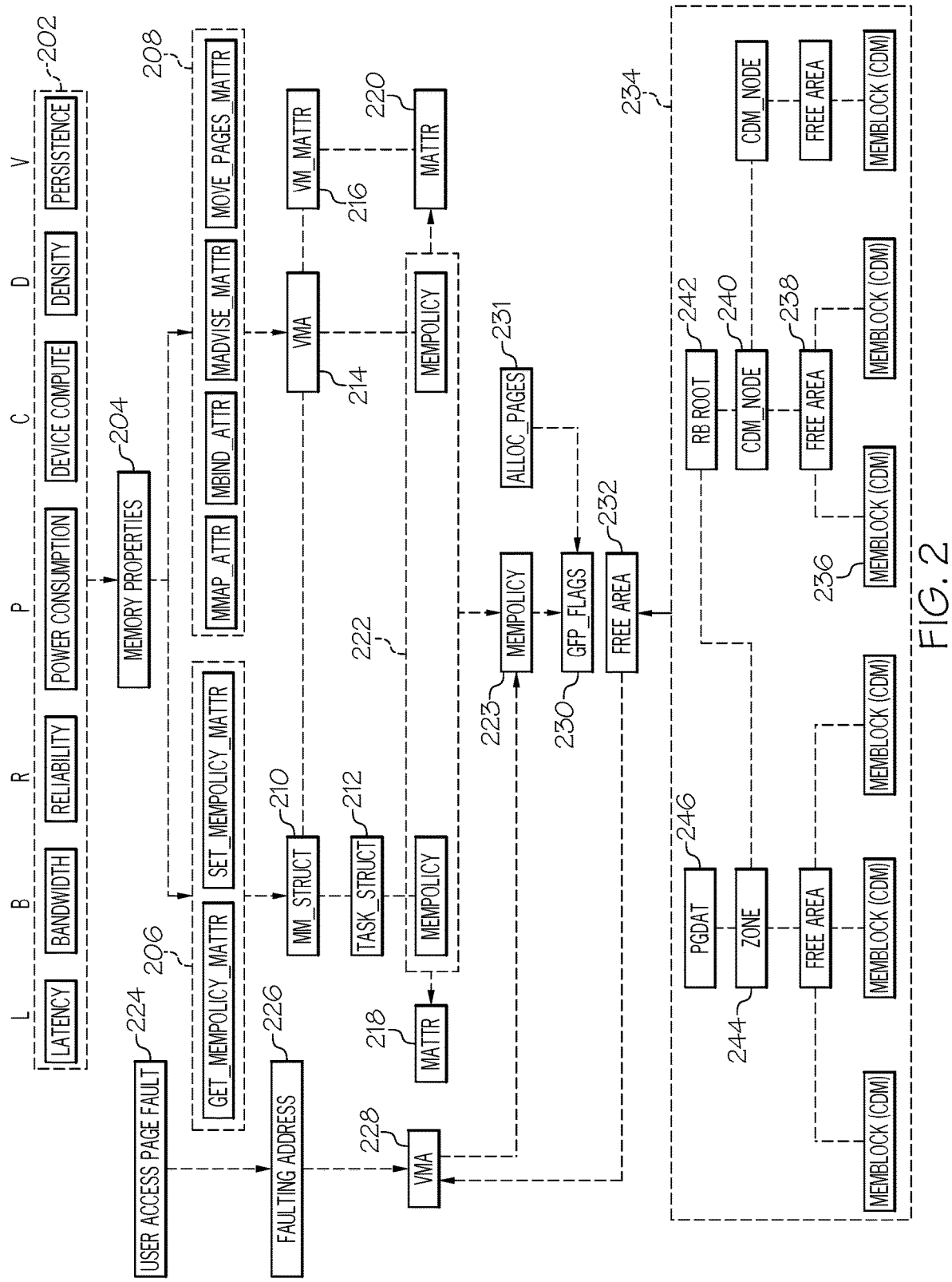
FIG. 2 illustrates a high-level flow-chart describing of one or more embodiments of the present invention.

FIG. 2 illustrates a high-level flow-chart describing of one or more embodiments of the present invention. More specifically, FIG. 2 presents an exemplary embodiment of the present invention for setting memory policy attributes and page fault scenarios.

One or more of various memory attributes (latency, bandwidth, reliability, power consumption, device compute (ability), density, persistence) shown in block 202 are selected from the user space to define the requisite memory properties needed by the user/application (block 204). The selected memory properties from block 204 are then used to get/set the memory policies (block 206) for the user-requested memory attributes, as well as map, bind, advise, and describe how to move pages according to the user-requested memory attributes (block 208).

The memory policy (block 206) for the memory attributes is used to select the appropriate type of memory module structure (block 210), as well as matching the memory to a particular task structure (block 212), such as a particular type of application.

Based on the user-requested memory attributes from block 208, a Virtual Memory Address (VMA) is allocated (block 214), as derived from the virtual memory attribute (block 216), which is derived from the user-space requested memory attributes (block 220). As shown in FIG. 2, the VMA (block 214), memory module structure (block 210), task structure (block 212) that are requested from the user space define the memory policy (block 222), which further defines the memory attributes (blocks 218 and 220).

As shown in block 224, assume that a page fault occurs. The system identifies the faulting address (block 226) of the data that is not available in the page, leading to a Virtual Memory Address (VMA) of the data (block 228). This VMA is sent to the memory policy (block 223), which generates a Get Free Page (GFP) flag (block 230), which gets an allocated page (of memory) (block 231) that is currently free (block 232). However, this leads to the problem of choosing the right free area shown in block 232. The process shown within block 234 solves this problem.

As shown in block 234, various free areas (e.g., block 238) of memory are identified in physical memory, such as Coherent Device Memory (CDM) in a device (e.g., block 236) on the computer. This leads to the location of a CDM node (e.g., memory found in a device, as shown in block 240), which is depicted in a red/black tree (specifically, a red/black root node—see block 242). This root node (actually a black node in the red/black tree) thus describes the free area zone (block 244) that holds the page data (block 246) in the free area (block 232).

Figure 3:
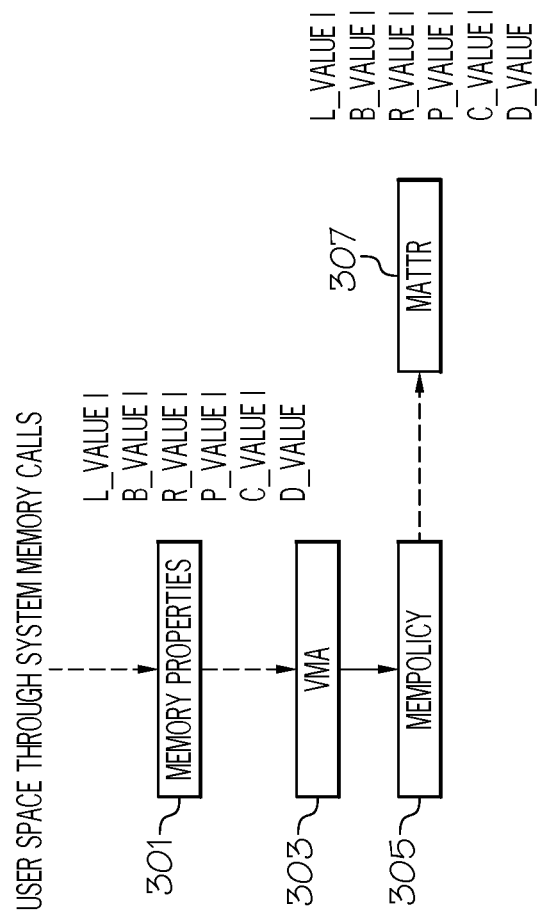
FIG. 3 depicts virtual memory with attributes that are used in one or more embodiments of the present invention.

FIG. 3 depicts virtual memory with attributes that are used in one or more embodiments of the present invention. That is, user space (e.g., a system memory call) will request certain memory properties (block 301), such as properties related to latency, bandwidth, reliability, power consumption, compute ability, density, etc. of the physical memory. The Virtual Memory Address (VMA) of memory devices with those requested properties (block 303) is then sent to the memory policy (block 305), which is based on the requested memory properties. This memory policy is a rule that directs a memory module manager to locate the physical address of the virtual memory that has the requested memory attributes (block 307).

Figure 4:
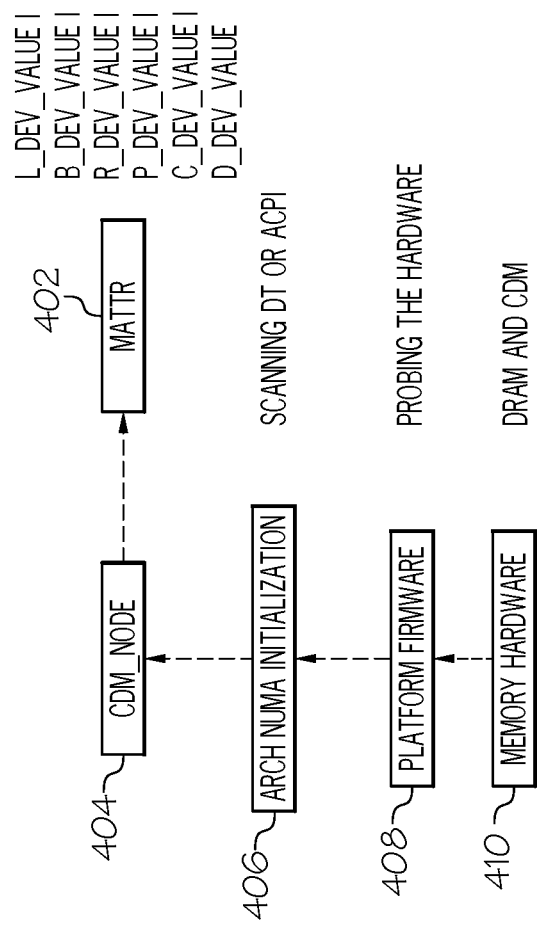
FIG. 4 illustrates physical memory with attributes that are used in one or more embodiments of the present invention.

As shown in FIG. 4, physical memory having the requested attributes is identified. That is, assume that the requested memory attributes are shown in block 402. As such, a node in the red/black tree is identified that meets these requested memory attributes, which in an embodiment of the present invention is a Coherent Device Memory (CDM), as shown in block 404. This leads to the initialization of an architecture for a Non-Uniform Memory Access (block 406), which can be achieved by scanning an Advanced Configuration and Power Interface (ACPI) or other data table. This allows the system to probe the memory sub-systems, in order to locate the appropriate platform firmware (block 408) needed to access the appropriate memory hardware (block 410), which is part of system memory (e.g., a DRAM) and/or other device memory (CDM).

Thus, one or more embodiments of the present invention perform the following steps. Step 1 is to choose the right free area for a given memory policy based on the memory attribute description. Step 2 is matching the user requested attributes to device attributes. Step 3 is computing cumulative attribute values.

In Step 1, the system (e.g., executing PHPH 147 shown in FIG. 1) chooses the right free_area[ ] for a given memory policy based on the memory attribute description. In one or more embodiments of the present invention, memory policy attributes get converted as logically OR'ed values of applicable Get Free Page (GFP) flags in between. If the memory requests are performed during kernel execution (i.e., during kernel based memory allocation requests through alloc_pages), GFP flags are specified directly, since there is no applicable memory policy (which would be available from the user space when an application call is made). Step 1 is described in FIG. 5.

Figure 5:
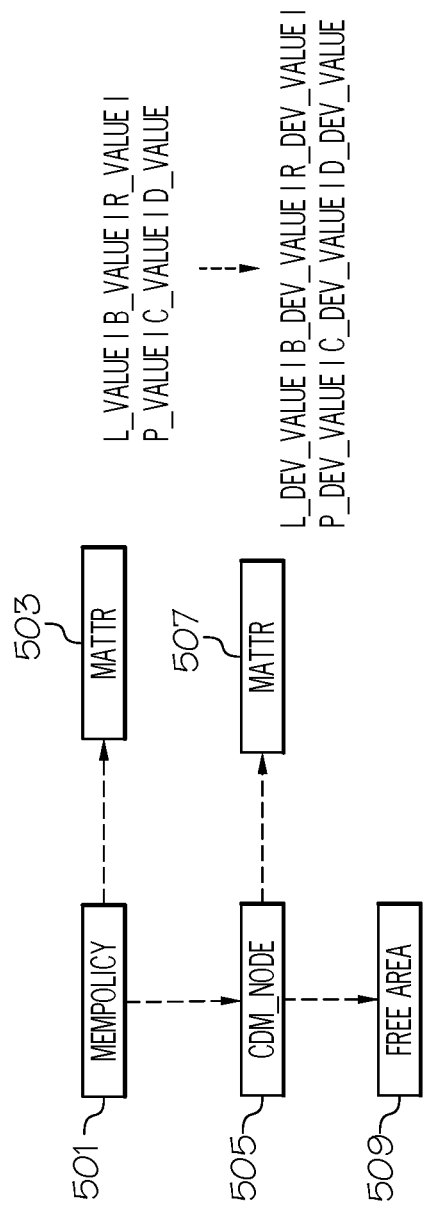
FIG. 5 depicts use of a memory policy in one or more embodiments of the present invention.

With reference then to FIG. 5, assume that a memory policy is available (block 501). This memory policy has been predefined as a set of rules that identify what type of memory is to be used with certain types of applications and/or operating systems. As such, the memory policy defines attributes of required memory (block 503), such as levels of latency, bandwidth, etc. The memory policy (block 501) also defines and identifies the node (i.e., memory), such as that depicted in block 505 and whose memory attributes are represented by block 507, that has the requested memory attributes. This leads to the memory depicted in block 505 telling the system what memory blocks in the memory are free to be used (block 509).

Figure 6:
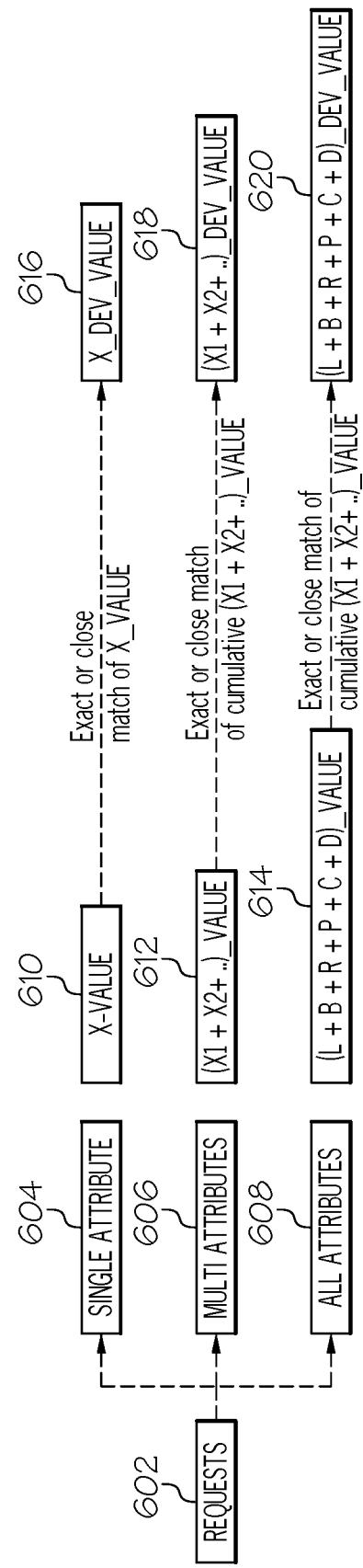
FIG. 6 illustrates a high-level view of a process for matching user requested attributes to device attributes in one or more embodiments of the present invention.

Step 2 is depicted in FIG. 6, which illustrates a high-level view of a process for matching user requested attributes to device attributes in one or more embodiments of the present invention.

As shown in FIG. 6, one or more requests for memory are received from user space or from a kernel (block 602). In various embodiments of the present invention, the attributes of the type of memory being requested are a single attribute (block 604), multiple attributes (block 606), or all attributes (block 608) from the available attribute descriptions (see FIG. 2).

If only a single attribute is being requested (block 604), then that single attribute (block 610) is matched (either exactly or closely) to a value for an attribute of a particular memory device (block 616). For example, if the request is for a memory that has a read/write time (access time) of 50 nanoseconds, and a particular memory device (e.g., a DRAM on the computer) has an access time of 50 nanoseconds, then this is a perfect match and that particular memory device is selected to be used by the application that made the request. Alternatively, if the particular memory device has an access time of 60 nanoseconds, and the memory policy states that a device that is within 20% of the requested attribute, then that particular memory device is still selected, since 60 nanoseconds is within 20% of 50 nanoseconds.

If multiple attributes (e.g., a certain level of latency and a certain level of reliability) are requested, then these multiple attributes (block 612) are matched to a particular memory device that meets these multiple attributes (block 618).

If all of the attributes shown in FIG. 2 are being requested at certain levels (block 614), then the device that meets all of these attribute levels is selected (block 620).

Figure 7:
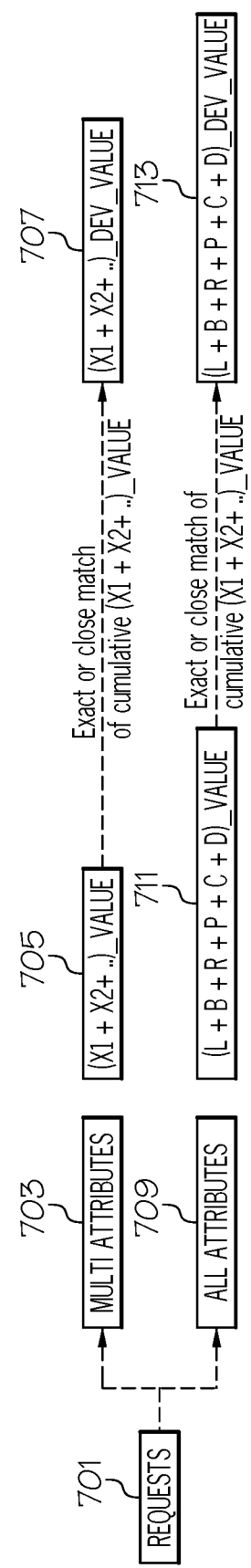
FIG. 7 depicts a high-level view of a process for computing cumulative attribute values in one or more embodiments of the present invention.
Figure 8:
FIG. 8 illustrates a process for multiplying a priority value with each attribute in one or more embodiments of the present invention.
Figure 9:
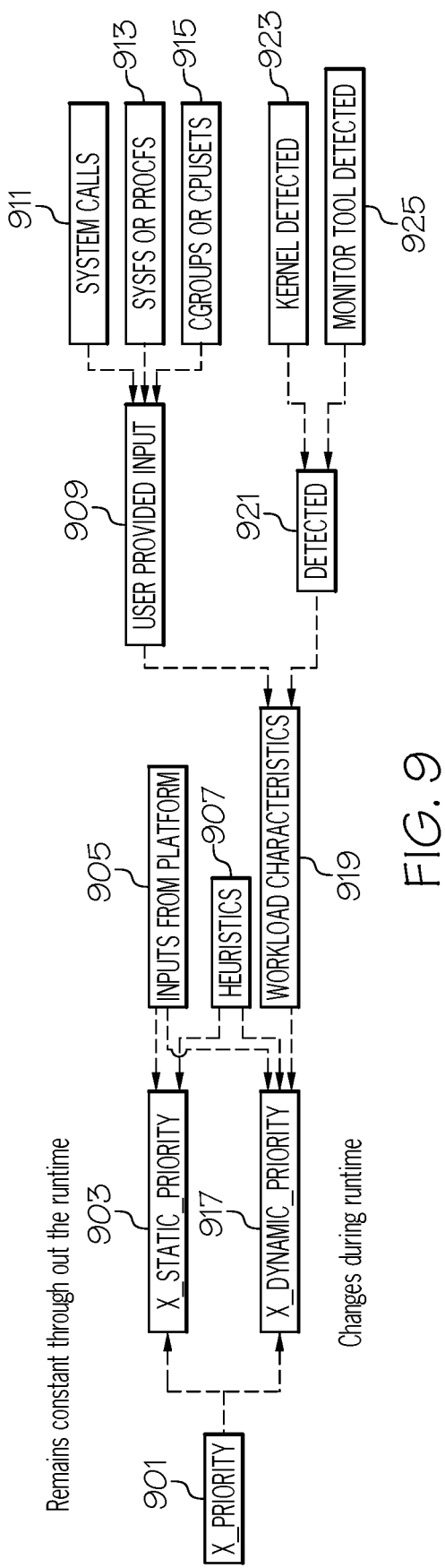
FIG. 9 depicts a use of static properties and dynamic properties in one or more embodiments of the present invention.

Step 3 is depicted in FIGS. 7-9.

Thus, FIG. 7 depicts a high-level view of a process for computing cumulative attribute values in one or more embodiments of the present invention. As shown in block 701, one or more requests for specific types of memory (i.e., memory having certain memory attributes) come from user space or the kernel (block 701). If multiple attributes are being requested (block 703), then the values of these attributes (block 705) are matched with the attributes of one or more particular memory devices (block 707). If specific values for all of the attributes described in FIG. 2 are requested (block 709), then these requested values (block 711) are matched to the attribute values of one or more specific memory devices (block 713).

As shown in FIG. 8, in one or more embodiments of the present invention a priority value is multiplied against each requested attribute in one or more embodiments of the present invention. For example, if the request for the memory device (block 802) specifies multiple attributes that the application/kernel needs (block 804), not all of the attributes are deemed to have the same importance. For example, if the persistence attribute is very important, then the value of the requested persistence level is weighted heavily (e.g., the weighting value is 100). However, if the power consumption level is not important, then the value of the requested power consumption level is weighted lower (e.g., the weighting value is only 20). Thus, when all weighted attribute values are summed (block 806) to reach a total attribute value, the power consumption level does not impact on the decision to select a certain memory device. For example, assume that the value of the persistence attribute is 70 (according to some predefined scale) and the weight for the persistence value is 100. As such, the weighted value of the persistence attribute is 70×100=7,000. Assume also that the value of the power consumption level is 80 (according to another predefined scale), but the weight for the power consumption level is only 2. As such, the weighted value of the power consumption level is 80×2=160. Thus, the total weighted attribute value is 7,160, indicating that the power consumption level has little impact in (closely) matching the request to a particular memory device.

Blocks 808 and 810 go through the same process just described for blocks 804 and 806, but apply weights to all of the attributes shown in FIG. 2.

FIG. 9 depicts a use of static properties and dynamic properties in one or more embodiments of the present invention.

As shown in block 901, a request includes a priority level (and/or properties of requested memory devices) for the request (block 901). For example, the request states that the request for a particular type of memory device is urgent, important, or routine (in descending order of priority). In one embodiment, the level of priority (and/or the properties of the requested memory devices) is static (block 903), in which it remains constant throughout the runtime of the requesting application/kernel. In another embodiment, the level of priority (and/or properties) of the devices is dynamic (block 917), in which it changes during runtime.

Assuming that the request's priority level is static (block 903), then the level of priority (and/or properties) is established and/or confirmed by inputs from the platform (block 905), such as levels provided by the requesting application. Heuristics (block 907), which are approximation algorithms, are used in one or more embodiments to establish/confirm the priority (and/or property) levels. In one or more embodiments of the present invention, the actions depicted in block 905 and/or block 907 are also used to establish and/or confirm the priority (and/or property) level of the requested memory device(s).

Other factors also come into play when establishing the dynamic priority (and/or property) levels shown in block 917. For example, workload characteristics (block 919) determine what types of memory devices are requested and/or the priority of such requests. The workload characteristics shown in block 919 are based on user provided inputs (block 909), which actually come from an application and/or kernel, as well as the detection (block 921) of a kernel (block 923) and/or an application or other call detected by a monitor tool (block 925). The information from block 909 is derived from system calls (e.g., calls from an application or operating system for a particular type of memory device)—block 911; a pseudo filesystem (sysfs) that describes information about various kernel subsystems or process filesystem (procfs) that includes information about processes that are running on the system—block 913; and/or control groups (cgroups) that describes resource usage in a system and/or central processing unit (CPU) set (cpuset) that defines a list of CPUs and memory nodes available to the kernel running on the computer that is making the call for memory devices having certain attributes—block 915.

Figure 10:
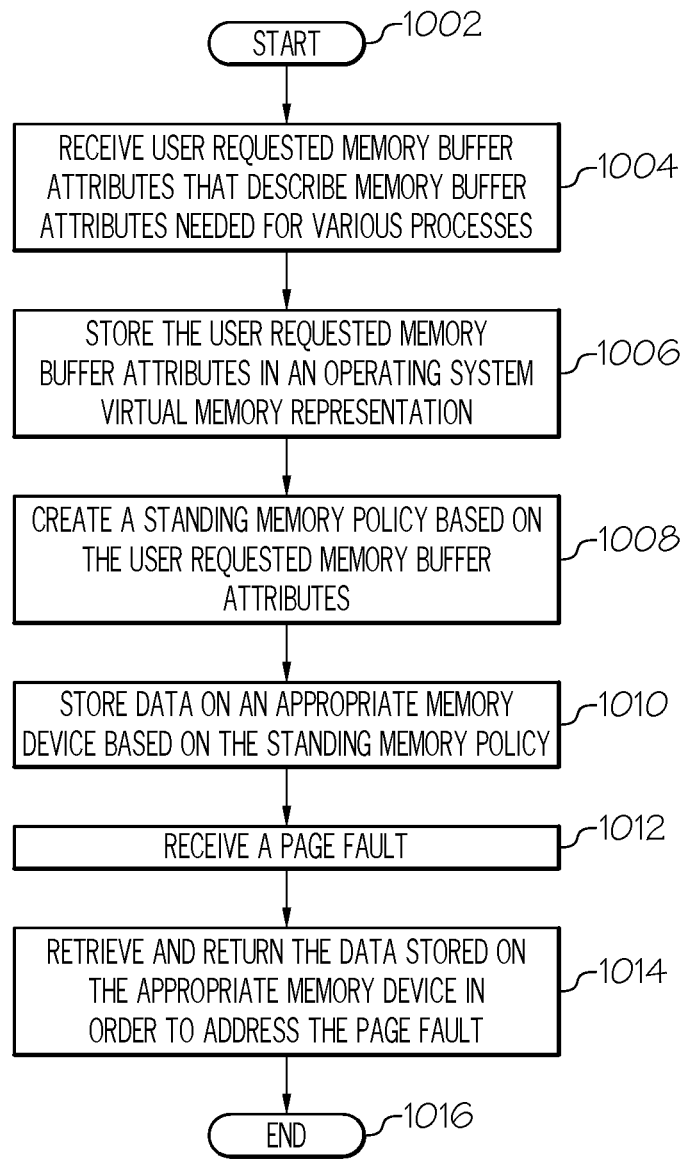
FIG. 10 is a high-level flow-chart of one or more steps performed in a processor-based method in accordance with one or more embodiments of the present invention.

With reference now to FIG. 10, a high-level flow-chart of one or more steps performed in a processor-based method in accordance with one or more embodiments of the present invention is presented.

After initiator block 1002, one or more processors (e.g., processor(s) 103 shown in FIG. 1) receive user requested memory buffer attributes that describe memory buffer attributes needed for various processes, as described in block 1004. That is, the user (which in one or more embodiments is actually an application, an operating system, or a kernel) presents attributes (see FIG. 2) of memory (also referred to as memory buffer) that are required for the application/OS/kernel.

As depicted in block 1006, the processor(s) store the user requested memory buffer attributes in an operating system virtual memory representation, which describes various types of memories used by the system. That is, the operating system virtual memory is virtual memory that is used to store the attributes that the requesting application/OS/kernel needs in the memory/memory buffer.

As depicted in block 1008, the processor(s) create a standing memory policy based on the user requested memory buffer attributes. That is, once the requested memory buffer attributes are received, then a standing policy is created stating that any memory to be used by (allocated to) that particular type of application/OS/kernel will comport with the criteria described by the attributes needed for that particular type of application/OS/kernel.

As described in block 1010, the processor(s) store data on an appropriate memory device based on the standing memory policy. That is, as described herein, the standing memory policy describes the type of memory to be used with that particular type of application/OS/kernel. An appropriate memory device that meets the attributes described in the standing memory policy is then used to store data for use with that particular type of application/OS/kernel.

As described in block 1012, the processor(s) subsequently receive a page fault, which is caused by the data being called by a process not being currently mapped by a memory management unit (MMU) into a virtual address space of the process.

As described in block 1014, the processor(s), in response to receiving the page fault, retrieve and return the data stored on the appropriate memory device in order to address (correct) the page fault.

The flow-chart ends at terminator block 1016.

In an embodiment of the present invention, the user requested memory buffer attributes describe a task type. That is, the attributes are based on what type of task is being performed by the requesting application, operating system, or kernel. For example, if the request for a memory device is from an application that is storing photos (task type), then the requested memory is heavily weighted towards memory with high bandwidth, but is not weighted heavily towards memory that has on-board compute capability.

In an embodiment of the present invention, the user requested memory buffer attributes describe a memory buffer type. For example, in various embodiments of the present invention the requested memory (buffer) attributes request a particular type of memory, such as DDR1, PCM, etc.

In an embodiment of the present invention, the processor(s) scan an advanced configuration and power interface (ACPI) table in order to identify memory buffer attributes associated with each of the various types of memories used by the system. That is, the ACPI table includes a listing and description of various types of memory that are found in the different types of memory in the memory system. This ACPI table is scanned in order to match the requested attributes of the memory to the appropriate memory device.

In an embodiment of the present invention, the processor(s) create an attribute-based buddy table for the various types of memories used by the system. The attribute-based buddy table is a table that pairs sets of two types of memories that satisfy the memory buffer attributes needed for various processes. That is, when the requested attributes for the memory are received from the application/OS/kernel, rather than match the requested attributes to just one type of memory device, the requested attributes are matched to two types of memory devices, which are found in the attribute-based buddy table. Thus, a hybrid memory of two types of memory devices is established that provides the requested attributes. For example, if the requested attributes request memory that is fast (e.g., DDR5) and is stable (e.g., PCM), then the system will store data for that particular application/OS/kernel on both DDR5 and PCM memory.

In an embodiment of the present invention, the processor(s) create a weighted graph of the various types of memories used by the system, where the weighted graph depicts weighted attributes of the various types of memories used by the system; and then select a highest weighted memory from the weighted graph as the appropriate memory device. That is, the weighted values described in FIG. 8 for attributes are depicted in a graph (e.g., a red/black graph) according to their weights. The node with the highest weighted attributes is thus deemed to be the most important type of memory device for a particular type of application/OS/kernel, and is thus selected for use by that particular type of application/OS/kernel.

In an embodiment of the present invention, the process calling the data is a boot process. In this embodiment, the processor(s) create a boot weighted graph of the various types of memories used by the system during boot time, where the boot weighted graph depicts weighted attributes of the various types of memories used by the system during boot time; and then select a highest weighted memory from the weighted graph as the appropriate memory device. That is, the weighted values described in FIG. 8 for attributes are depicted in a graph (e.g., a red/black graph) according to their weights. The node with the highest weighted attributes is thus deemed to be the most important type of memory device for a particular type of boot process, and is thus selected for use by that particular type of boot process.

In an embodiment of the present invention, the process calling the data is an application process, and the processor(s) create a runtime weighted graph of the various types of memories used by the system during runtime of the application process, where the runtime weighted graph depicts weighted attributes of the various types of memories used by the system during runtime; and then select a highest weighted memory from the weighted graph as the appropriate memory device. That is, the weighted values described in FIG. 8 for attributes are depicted in a graph (e.g., a red/black graph) according to their weights. The node with the highest weighted attributes is thus deemed to be the most important type of memory device for a particular type of application process, and is thus selected for use by that particular type of application process.

The framework and method described herein allows an application and/or kernel to allocate or move the workload to specific memory devices in consideration of memory technologies characteristics.

The disclosed invention provides the advantage of coherently moving data in and out of an operating system requirement with the awareness on attributes. This provides optimization on different parameters based on the nature of workloads, and allocates memory based on the memory policy.

The present invention thus enables the system to seamlessly identify and select Coherent Device Memory types which have many different characteristics.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
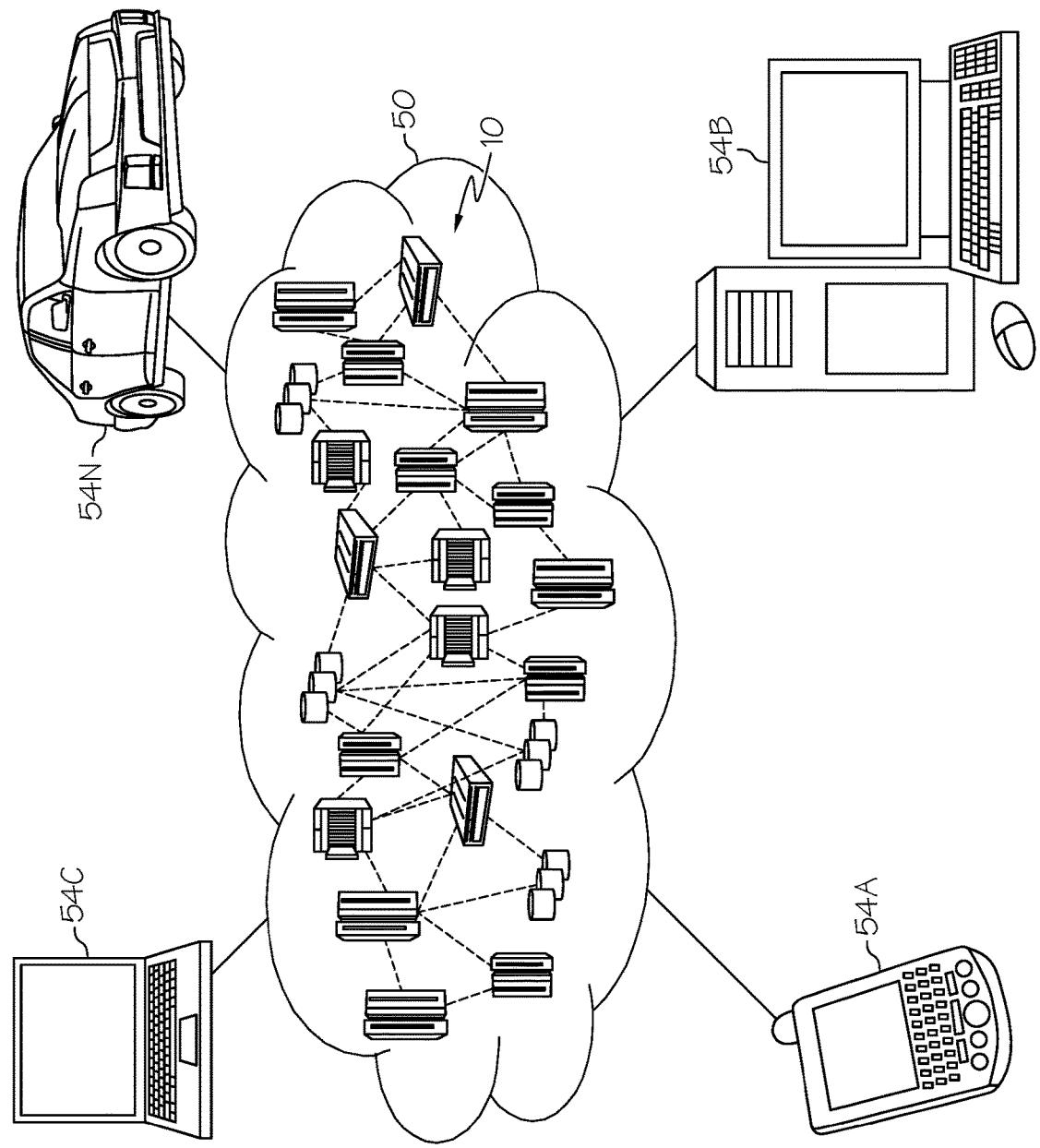
FIG. 11 depicts a cloud computing environment according to an embodiment of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 11 are intended to be illustrative only and that computing nodes 10 and cloud computing environment 50 can communicate with any type of computerized device over any type of network and/or network addressable connection (e.g., using a web browser).

Figure 12:
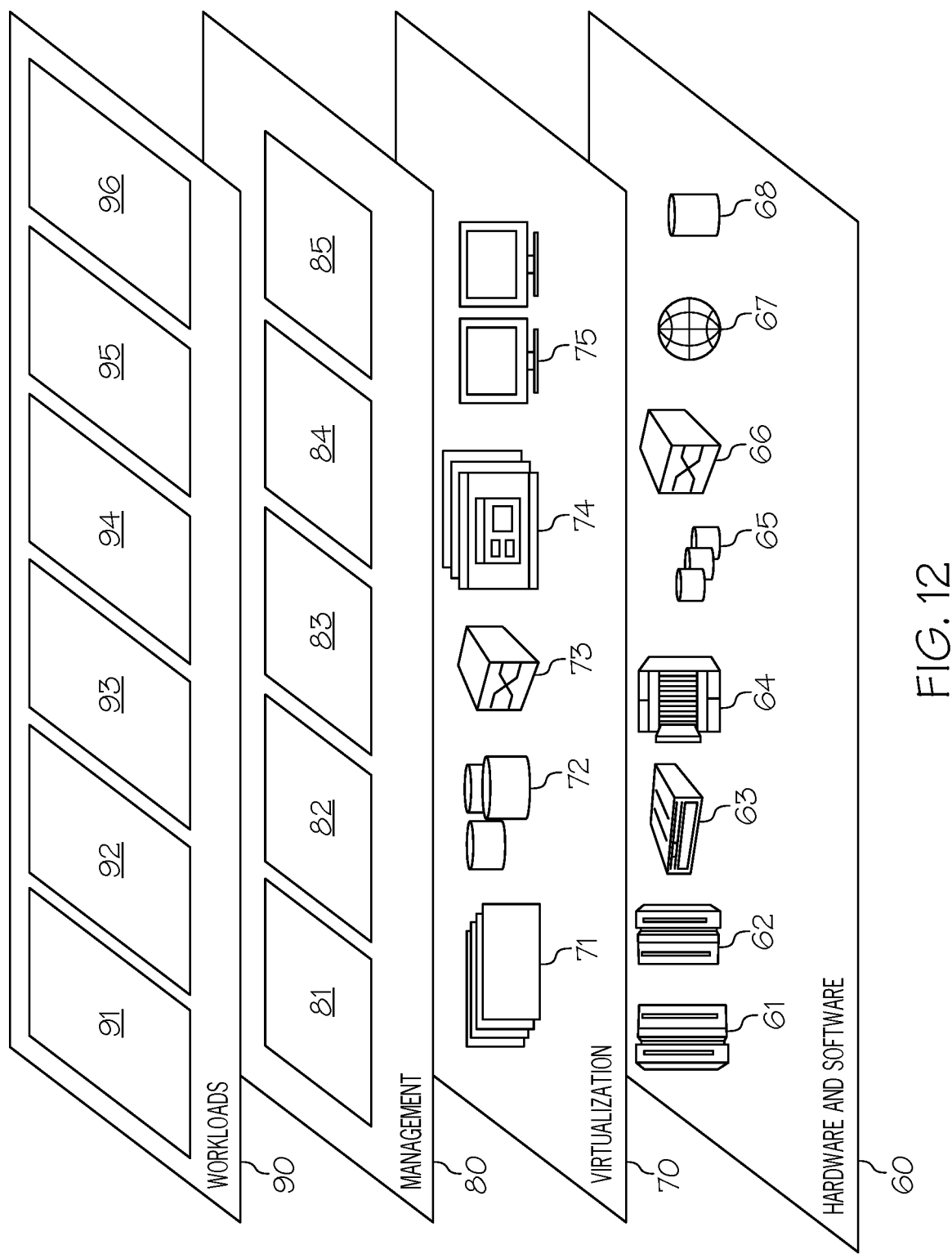
FIG. 12 depicts abstraction model layers of a cloud computer environment according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met.

Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and memory selection processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by one or more processors, requested memory buffer attributes from a requesting application, wherein the requested memory buffer attributes describe memory buffer attributes needed in a memory buffer for various processes in the requesting application, wherein the requested memory buffer attributes describe bandwidth, density, probable rate of memory failure, and logic within the memory buffer for performing logic processing on the device without use of a central processing unit, and wherein the density is a density of transistors on a memory chip that supports the memory buffer;
   storing, by one or more processors, the requested memory buffer attributes in a virtual memory representation, wherein the virtual memory representation describes various types of memories used by a system, wherein the virtual memory is virtual memory that is used to store attributes of the memory buffer that are required by the requesting application, and wherein the virtual memory representation includes virtual memory addresses of memory devices that have the requested memory buffer attributes;
   creating a standing memory policy based on the requested memory buffer attributes, wherein the standing memory policy identifies what type of memory is to be used with the requesting application, wherein the standing memory policy defines the bandwidth, density, probable rate of memory failure, and logic for performing logic processing on the device without use of the central processing unit, and wherein the standing memory policy identifies the memory chip that supports the memory buffer;
   storing, by one or more processors, data on an appropriate memory device used by the system based on the standing memory policy, wherein the appropriate memory device is the memory chip that supports the memory buffer that is used with the application;
   receiving, by one or more processors, a page fault, wherein the page fault is based on the data stored on the appropriate memory device being called by the requesting application not being currently mapped by a memory management unit (MMU) into a virtual address space of the requesting application; and
   in response to receiving the page fault, retrieving and returning, by one or more processors, the data stored on the appropriate memory device in order to address the page fault.

2. The method of claim 1, wherein the requested memory buffer attributes describe a particular task type being performed by the requesting application, wherein the particular task type is a task of storing photos.

3. The method of claim 1, wherein the requested memory buffer attributes further describe a memory buffer architecture type.

4. The method of claim 1, further comprising:
   scanning, by one or more processors, an advanced configuration and power interface (ACPI) table in order to identify memory buffer attributes associated with each of the various types of memories used by the system, wherein the ACPI table includes a listing and description of various types of memory that are found in the system that is running the requesting application, and wherein the ACPI table is scanned in order to match the requested memory buffer attributes to the appropriate memory device.

5. The method of claim 1, wherein the requested memory buffer attributes are received from the requesting application, and wherein the method further comprises:
   creating, by one or more processors, an attribute-based buddy table for the various types of memories used by the system, wherein the attribute-based buddy table pairs a DDR5 memory and a PCM memory for use by the requesting application; and storing, by one or more processors, data for the requesting application on both the DDR5 memory and the PCM memory.

6. The method of claim 1, further comprising:

creating, by one or more processors, a weighted graph of the various types of memories used by the system, wherein the weighted graph depicts weighted attributes of the various types of memories used by the system, and wherein at least two of the various types of memories have different weights of attributes that describes a level of importance of each type of memory when executing a process; and selecting, by one or more processors, a highest weighted memory from the weighted graph as the appropriate memory device.

7. The method of claim 1, wherein the process calling the data is a boot process, and wherein the method further comprises:

creating, by one or more processors, a boot weighted graph of the various types of memories used by the system during boot time, wherein the boot weighted graph depicts weighted attributes of the various types of memories used by the system during boot time, and wherein at least two of the various types of memories have different weights that describes a level of importance of each type of memory when booting up the system; and selecting, by one or more processors, a highest weighted memory from the boot weighted graph as the appropriate memory device.

8. The method of claim 1, wherein the process calling the data is an application process, and wherein the method further comprises:

creating, by one or more processors, a runtime weighted graph of the various types of memories used by the system during runtime of the application process, wherein the runtime weighted graph depicts weighted attributes of the various types of memories used by the system during runtime, and wherein at least two of the various types of memories have different weights that describes a level of importance of each type of memory during runtime of the application process; and selecting, by one or more processors, a highest weighted memory from the runtime weighted graph as the appropriate memory device.

9. A computer program product comprising a non-transitory computer readable storage device having program instructions embodied therewith, the program instructions readable and executable by a computer to perform a method comprising:

receiving requested memory buffer attributes that describe memory buffer attributes needed for various processes, wherein the requested memory buffer attributes are received from a kernel of an operating system, wherein the requested memory buffer attributes describe bandwidth, density, probable rate of memory failure, and logic within the memory buffer for performing logic processing on the device without use of a central processing unit;

storing the requested memory buffer attributes in a virtual memory representation, wherein the virtual memory representation describes various types of memories used by a system;

storing data on an appropriate memory device used by the system based on a standing memory policy that identifies a type of memory that is used with a certain type of application, wherein the appropriate memory device is a memory device that is used with the certain type of application;

finding, by the kernel of the operating system, the appropriate memory device, wherein the appropriate memory device has the requested memory buffer attributes;

receiving a page fault, wherein the page fault is based on the data being called by a process but not being currently mapped by a memory management unit (MMU) into a virtual address space of the process; and in response to receiving the page fault, retrieving and returning the data stored on the appropriate memory device in order to address the page fault.

10. The computer program product of claim 9, wherein the requested memory buffer attributes describe a particular task type being performed by the requesting application, wherein the particular task type is a task of storing photos, and wherein a request for a memory device from the requesting application is weighted towards memory with high bandwidth and is not weighted towards memory that has on-board compute capability.

11. The computer program product of claim 9, wherein the user requested memory buffer attributes describe a memory buffer type.

12. The computer program product of claim 9, wherein the method further comprises:

scanning an advanced configuration and power interface (ACPI) table in order to identify memory buffer attributes associated with each of the various types of memories used by the system;

scanning, by one or more processors, an advanced configuration and power interface (ACPI) table in order to identify memory buffer attributes associated with each of the various types of memories used by the system, wherein the ACPI table includes a listing and description of various types of memory that are found in the system that is running the requesting application, and wherein ACPI table is scanned in order to match the requested memory buffer attributes to the appropriate memory device.

13. The computer program product of claim 9, wherein the requested memory buffer attributes are received from the requesting application, and wherein the method further comprises:

creating an attribute-based buddy table for the various types of memories used by the system, wherein the attribute-based buddy table pairs a DDR5 memory and a PCM memory for use by the requesting application; and storing data for the requesting application on both the DDR5 memory and the PCM memory.

14. The computer program product of claim 9, wherein the method further comprises:

creating a weighted graph of the various types of memories used by the system when executing the process, wherein the weighted graph depicts weighted attributes of the various types of memories used by the system when executing the process; and selecting a highest weighted memory from the weighted graph as the appropriate memory device.

15. The computer program product of claim 9, wherein the process calling the data is a boot process, and wherein the method further comprises:

creating a boot weighted graph of the various types of memories used by the system during boot time, wherein the boot weighted graph depicts weighted attributes of the various types of memories used by the system during boot time; and selecting a highest weighted memory from the boot weighted graph as the appropriate memory device.

16. The computer program product of claim 9, wherein the process calling the data is an application process, and wherein the method further comprises:

creating a runtime weighted graph of the various types of memories used by the system during runtime of the application process, wherein the runtime weighted graph depicts weighted attributes of the various types of memories used by the system during runtime; and selecting a highest weighted memory from the runtime weighted graph as the appropriate memory device.

17. The computer program product of claim 9, wherein the program instructions are provided as a service in a cloud environment.

18. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving user requested memory buffer attributes that describe memory buffer attributes needed for various processes, wherein the user requested memory buffer attributes are received from a kernel of an operating system, and wherein the user requested memory buffer attributes describe bandwidth, density, probable rate of memory failure, and logic within the memory buffer for performing logic processing on the device without use of a central processing unit;

storing the user requested memory buffer attributes in a virtual memory representation, wherein the virtual memory representation describes various types of memories used by a system;

storing data on an appropriate memory device used by the system based on standing memory policy that identifies a type of memory that is used with a certain type of application, wherein the appropriate memory device is a memory device that is used with the certain type of application;

finding, by the kernel of the operating system, the appropriate memory device, wherein the appropriate memory device has the user requested memory buffer attributes;

receiving a page fault, wherein the page fault is based on the data being called by a process but not being currently mapped by a memory management unit (MMU) into a virtual address space of the process; and in response to receiving the page fault, retrieving and returning the data stored on the appropriate memory device in order to address the page fault.

19. The computer system of claim 18, wherein the user requested memory buffer attributes describe a memory buffer type.

20. The computer system of claim 18, wherein the program instructions are provided as a service in a cloud environment.

* * * * *